Jan. 2, 1951     R. LOPEZ     2,536,756
SELF-LOADING OVEN FOR BAKING BREAD
Filed April 7, 1949     2 Sheets-Sheet 2
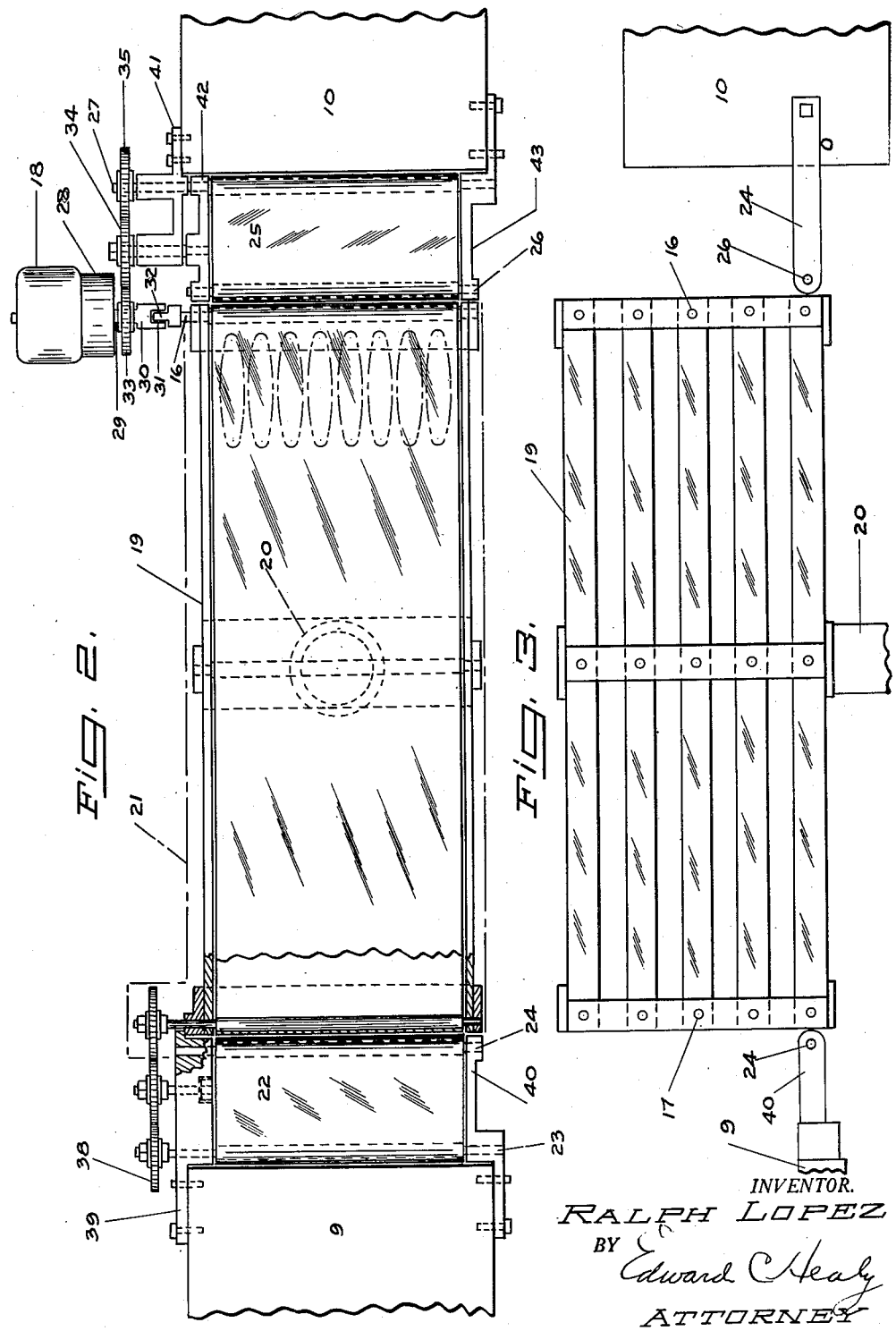
INVENTOR.
RALPH LOPEZ
BY Edward C. Healy
ATTORNEY Patented Jan. 2, 1951

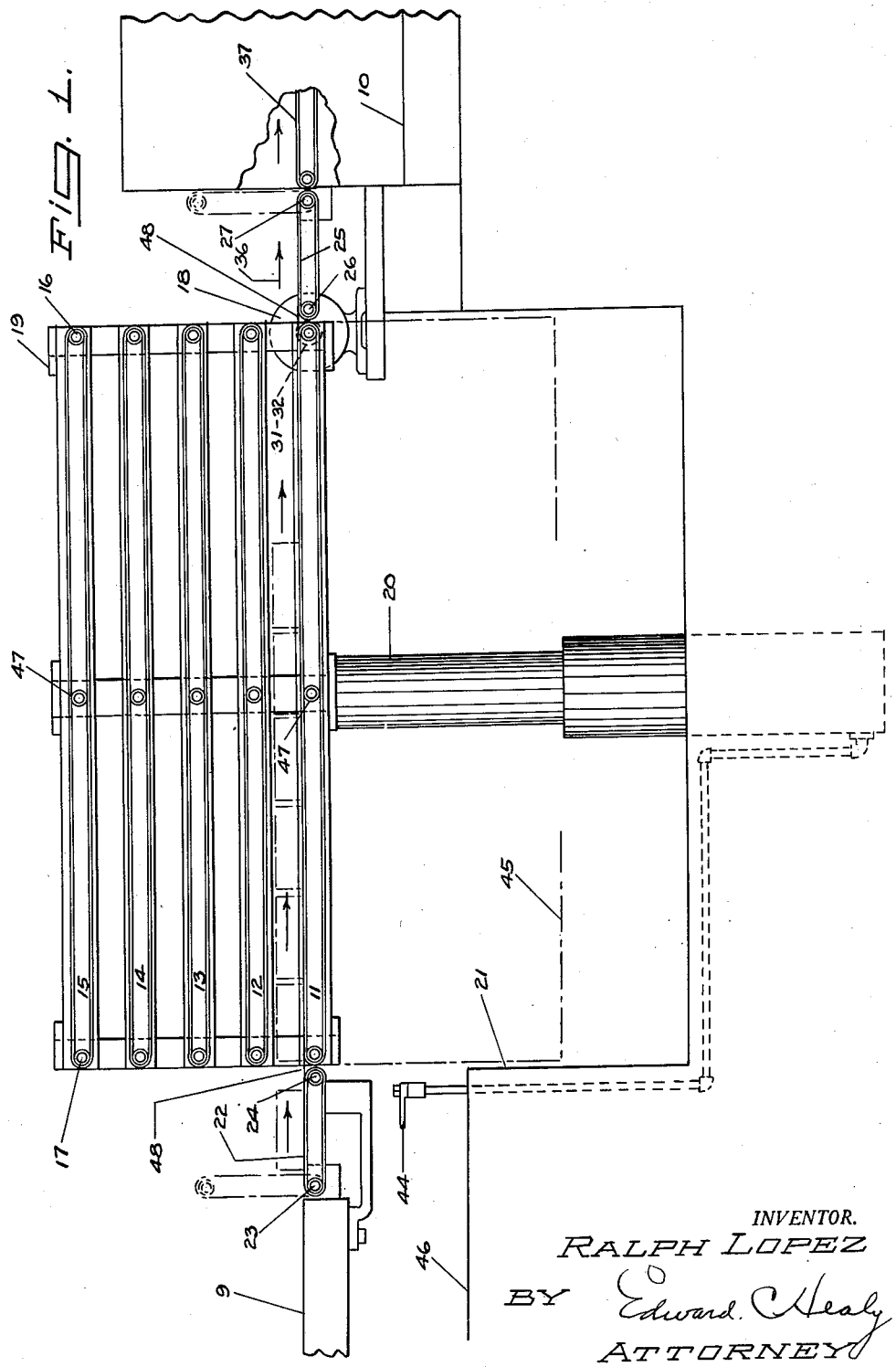

2,536,756

UNITED STATES PATENT OFFICE 2,536,756

SELF-LOADING OVEN FOR BAKING BREAD

Ralph Lopez, San Francisco, Calif.

Application April 7, 1949, Serial No. 86,070

1 Claim. (Cl. 214—21)

This invention relates to improvements in mechanisms associated with bread-baking ovens and has particular reference to a suitable mechanism through the medium of which the ovens for baking bread will be automatically self-loading.

The principal object of the invention is to produce a mechanism that will supply unbaked loaves to the oven where the loaves will be baked, the supply mechanism eliminating the manpower and labor incident to the cumbersome and time-taking labor required in modern bakeries.

A still further object of the present invention is the provision of an auxiliary conveyor positioned between the main conveyor and the oven.

A still further object of the present invention is the provision of a pit capable of receiving the main frame carrying the conveyor belts and the further provision of a hydraulic hoist for raising and lowering the said frame, whereby the said conveyors can be adjusted in alignment with the said loading platform and oven.

A still further object of the present invention is the provision of a specially constructed means for connecting the driving mechanisms to the conveyors.

A still further object of the present invention is the provision provided for adjusting the auxiliary conveyors for facilitating the raising and lowering of the frame carrying the main conveyor.

A still further object of the present invention is to provide a bread and baking product conveying means that is durable, simple in construction, economical to manufacture and highly efficient and serviceable in use.

Another object of the invention is the provision of a vertically adjustable frame for supporting the said belts and to position the said frame between the said platform and oven.

A further object of the present invention is the provision of an auxiliary conveyor positioned between the platform and the frame carrying the conveyors to the oven. In the present method of baking "pan bread" the first step is to mold the dough into different shapes and forms and place the same in pans that are thereafter placed on racks. After a predetermined time the bread rises. The pans are then taken from the racks and loaded into the oven. This operation requires the services of two or more men, one to load the trays and the other to convey the bread to the oven.

In my system in the baking of "pan bread" it is only necessary that one man feed the bread holding pans to the conveyor, that in turn will automatically feed the bread, to be baked, to the oven. Accordingly, a great saving in manpower and labor will be effected.

In general practice in the making of "bottom" bread, where no pans are used, the said "bottom" bread is placed on canvas and allowed to rise. After one or more men cut the upper surface of the "bottom" bread to allow for heat expansion and to form bread of the "French" type, it is necessary for a second worker to quickly convey the cut bread to the oven. This is an extra laborious action and unless the "bottom" bread is quickly transported to the oven, an improper baking operation is experienced.

In my method it is only necessary to feed the "bottom" bread lengthwise to the conveyors, which in turn will feed the bread toward the oven. After each conveyor has started to convey the bread toward the oven, and before entering the oven, the cutting action of each ten loaves of the "bottom" bread can be accomplished in approximately 15 seconds by one worker stationed at the entrance to the oven. Thus a saving in labor and time will be accomplished and properly baked loaves of "bottom" bread will be assured.

In the accompanying drawings wherein for the purpose of illustration like numerals designate like parts throughout the same, Fig. 1 is a vertical longitudinal view of the device, shown partly in section and partly in elevation, Fig. 2 is a top plan view of the conveyors and driving mechanism for operating the same, Fig. 3 is a side elevational view illustrating how the auxiliary conveyors are adjustable for enabling the main conveyor to be raised and lowered relative to the platform and oven.

Referring in detail to the drawing and the numerals thereof the numeral 9 designates the loading platform and the numeral 10 the oven in which the bread or other products are baked.

The means provided for conveying the bread from the loading platform to the oven consists in the provision of a plurality of endless conveyor belts 11, 12, 13, 14 and 15, each of which are driven by suitable shafts designated as a whole by numerals 16 and 17 and operated by a conventional motor 18. The said shafts are revolvably supported in a substantial frame 19, which frame is, obviously, built up in any conventional rigid manner, and is supported on a conventional hydraulic hoist 20. The said hoist is mounted in a pit 21 that is adapted to receive the frame for enabling the frame to be vertically lowered therein, whereby the various conveyor belts can be adjusted in alignment with the said platform and oven. An auxiliary endless conveyor belt 22 is positioned in front of the loading platform 9 and is supported on the shafts 23 and 24, and likewise, a second auxiliary endless conveyor belt 25 is positioned between the main conveyor and oven and supported on the shafts 26 and 27. The said front auxiliary conveyor belt 22 enables the bread either in individual loaves or pans, to be placed thereon with complete freedom of action by the workman and the second auxiliary belt 25 provides space between the frame and oven for accommodating the workman.

As hereinbefore stated one of the objects of the present invention is the provision of means for automatically conveying the bread from the loading platform to the oven. It will be obvious that the main endless conveyor belts 11, 12, 13, 14 and 15 provide the necessary conveying means, but it will also be obvious that means must be provided for adjusting the said main conveyor belts in true alignment with the said loading platform and oven and the auxiliary conveyors positioned between the same and it will further be noted that means must be provided for individually operating the said main conveyor belts, whereby delivering of the bread is continuously made from the said platform to the oven. A suitable electric motor 18, including a gear reducing mechanism enclosed in a housing 28, is provided for driving the said main conveyor belts. The motor shaft 29 carries a suitable clutch or collar 30, slotted as at 31 and adapted to engage a key member 32, one key member 32 being fixed to each of the drive shafts 16 of the said main conveyor belts 11, 12, 13, 14 and 15. A drive gear 33 is fixed on the motor shaft 29 and engages an idler gear 34, which idler gear 34 drives the gear 35 fixed on the auxiliary conveyor belt shaft 27, whereby longitudinal movement in direction of the arrow 36 is imparted to the said auxiliary belt 25 for conveying individual loaves of bread or pans of bread from the main conveyors supported in the frame 19 to the conveyor belt 37 provided in the oven 10. The said oven conveyor belt 37 is of the conventional type well known in the art and for that reason the mechanism for operating the same is not shown. A small motor 38 is provided for operating the front auxiliary belt 22 to convey the bread from the platform 9 to the main conveyors supported in the frame 19. It will be noted that the front auxiliary belt 22 is supported on vertically adjustable frames 39 and 40, respectively, as disclosed to advantage in Fig. 1 and the rear auxiliary belt 25 is supported on frames 41, 42 and 43, respectively. It will be noted that the positions of the auxiliary belts, loading platform, oven and driving mechanisms are all stationary and the central frame 19 carrying the main conveyor belts is vertically adjustable.

From the foregoing description taken in conjunction with the accompanying drawings it will be obvious that the central frame 19 is supported on the hoist 20, over the pit 21, and carrying the main conveyor belts 11, 12, 13, 14 and 15 can be vertically adjusted by operating the control valve handle 44, whereby any one of the said conveyor belts can be aligned with the loading platform and oven for conveying bread from the loading platform to the oven. The said hydraulic hoist 20 can be any suitable type well known in the art and rigidly fixed to the central frame 9 in any suitable manner. The dot and dash lines 45 designate the outline of the central frame 19 when the same is lowered into the pit and the numeral 46 designates the ground line above the pit. The numeral 47 designates a series of centrally positioned idler rollers for providing additional support to the main conveyor belts. The numeral 48 designates a series of stationary plates to facilitate the carrying of the bread between the conveyors.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:

In combination with an oven for baking bread and a loading platform for receiving the articles to be baked, a frame longitudinally positioned between the oven and loading platform, a conveying means including a plurality of endless belts horizontally spaced in parallelism one above the other within the frame for receiving the loaves of bread and carrying the same, each of the belts being supported on shafts revolvably mounted on the frame, an auxiliary endless conveyor belt leading from the loading platform to the bread carrying belts in the frame for delivering the bread to the same, a second auxiliary endless conveyor belt positioned between the frame and oven for delivering the bread to the oven, means operatively connecting the belts within the frame to the auxiliary belts, means including an electric motor having a shaft for operating the belts, means associated with certain shafts supporting the belts within the frame and the motor shaft for adjustably connecting the shafts to the motor shaft, whereby the belt shafts are capable of being separately operated for enabling the frame to be vertically adjusted to adjust the belts in delivering positions with the loading platform and oven, means for vertically adjusting the frame, said means including a hydraulic hoist supporting the frame.

RALPH LOPEZ.

REFERENCES CITED

The following references are of record in the file of this patent:

UNITED STATES PATENTS

| Number | Name | Date |
| --- | --- | --- |
| 1,410,466 | Gantvoort | Mar. 21, 1922 |

FOREIGN PATENTS

| Number | Country | Date |
| --- | --- | --- |
| 433,778 | Great Britain | Aug. 15, 1935 |